(12) United States Patent
Lin

(10) Patent No.: US 10,924,202 B2
(45) Date of Patent: Feb. 16, 2021

(54) METHOD FOR TRANSMITTING DATA, TERMINAL DEVICE AND NETWORK DEVICE

(71) Applicant: GUANGDONG OPPO MOBILE TELECOMMUNICATIONS CORP., LTD., Guangdong (CN)

(72) Inventor: YaNan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/475,658

(22) PCT Filed: Jan. 5, 2017

(86) PCT No.: PCT/CN2017/070325
§ 371 (c)(1),
(2) Date: Jul. 2, 2019

(87) PCT Pub. No.: WO2018/126413
PCT Pub. Date: Jul. 12, 2018

(65) Prior Publication Data
US 2019/0349115 A1    Nov. 14, 2019

(51) Int. Cl.
*H04W 72/04* (2009.01)
*H04L 1/00* (2006.01)
*H04L 5/00* (2006.01)

(52) U.S. Cl.
CPC .......... *H04L 1/0003* (2013.01); *H04L 1/0071* (2013.01); *H04L 5/0007* (2013.01); *H04W 72/0446* (2013.01)

(58) Field of Classification Search
CPC ... H04L 1/0003; H04L 1/0007; H04L 1/0016; H04L 1/0071; H04L 5/0007; H04L 43/00;
(Continued)

(56) References Cited

U.S. PATENT DOCUMENTS

2010/0195614 A1\* 8/2010 Nimbalker ............ H04L 1/0025
370/330
2014/0161066 A1 6/2014 Chmiel et al.
(Continued)

FOREIGN PATENT DOCUMENTS

CN    101969360 A    2/2011
CN    102170334 A    8/2011
(Continued)

OTHER PUBLICATIONS

3GPP. Technical Specification Group Radio Access Network; Evolved Universal Terrestrial Radio Access(E-UTRA) Physical Layer Procedures (Release 9). 3GPP TS 36.213 V9.2.0. Jun. 30, 2010 (Jun. 30, 2010), section 7.1.7.
(Continued)

*Primary Examiner* — Robert J Lopata
(74) *Attorney, Agent, or Firm* — Ladas & Parry, LLP

(57) ABSTRACT

Disclosed are a method for transmitting data, a terminal device and a network device. The method comprises: a terminal device determining an MCS level used to transmit a current target transmission block; the terminal device, according to the MCS level and a TBS mapping relationship when a pre-set first resource parameter is met, determining a first TBS corresponding to the MCS level, wherein the TBS mapping relationship comprises a mapping relationship between the MCS level and the TBS; the terminal device, according to a second resource parameter used to transmit the target transmission block and the first TBS, determining a second TBS; and the terminal device, according to the second TBS, sending the target transmission block to a network device, or receiving the target transmission block sent according to the second TBS of the network device. In this way, the terminal device can effectively obtain TBS
(Continued)

information in the case that a value range of the resource parameter used to transmit data is relatively large.

22 Claims, 4 Drawing Sheets

(58) Field of Classification Search
CPC .. H04L 43/50; H04W 72/0446; H04W 24/00; H04B 3/46; H04B 17/00
USPC .......................................................... 370/252
See application file for complete search history.

(56) References Cited

U.S. PATENT DOCUMENTS

| | | | |
|---|---|---|---|
| 2014/0254509 A1* | 9/2014 | Chen | H04L 5/0058 370/329 |
| 2015/0078222 A1* | 3/2015 | Yang | H04L 5/0092 370/280 |
| 2015/0103760 A1 | 4/2015 | Zhang | |
| 2015/0215068 A1 | 7/2015 | Wu | |
| 2015/0215913 A1 | 7/2015 | Cheng et al. | |
| 2015/0318907 A1 | 11/2015 | Zhang et al. | |
| 2016/0081063 A1 | 3/2016 | Chen et al. | |
| 2016/0353427 A1 | 12/2016 | Grinshpun | |
| 2018/0006791 A1* | 1/2018 | Marinier | H04L 1/0059 |
| 2018/0167931 A1* | 6/2018 | Papasakellariou | H04L 1/1854 |
| 2018/0249370 A1* | 8/2018 | Zhang | H04L 1/0006 |
| 2018/0255550 A1* | 9/2018 | Takeda | H04W 48/16 |
| 2019/0029043 A1* | 1/2019 | Harada | H04L 25/0228 |
| 2019/0036640 A1* | 1/2019 | Xu | H04L 1/00 |
| 2019/0059020 A1* | 2/2019 | Ge | H04L 1/00 |
| 2019/0068318 A1* | 2/2019 | Marinier | H04L 1/1845 |
| 2019/0082441 A1* | 3/2019 | Liu | H04W 4/80 |
| 2019/0089511 A1* | 3/2019 | Saito | H04L 5/0057 |
| 2019/0173711 A1* | 6/2019 | Cheng | H04L 27/2627 |
| 2019/0208537 A1* | 7/2019 | Ke | H04L 1/0007 |

FOREIGN PATENT DOCUMENTS

| | | | |
|---|---|---|---|
| CN | 102196495 | A | 9/2011 |
| CN | 102684816 | A | 9/2012 |
| CN | 103580776 | A | 2/2014 |
| CN | 104144029 | A | 11/2014 |
| CN | 104272839 | A | 1/2015 |
| CN | 104753633 | A | 7/2015 |
| CN | 105009671 | A | 10/2015 |
| CN | 105960787 | A | 9/2016 |
| CN | 107431604 | A | 12/2017 |
| EP | 3547775 | A1 | 10/2019 |
| JP | 2016515337 | A | 5/2016 |
| RU | 2284591 | C2 | 9/2006 |
| WO | 2012155499 | A1 | 11/2012 |
| WO | 2015076712 | A1 | 5/2015 |
| WO | 2015114508 | A1 | 8/2015 |
| WO | 2016182274 | A1 | 11/2016 |

OTHER PUBLICATIONS

International Search Report in the international application No. PCT/CN2017/070325, dated Aug. 29, 2017.
Written Opinion of the International Search Authority in the international application No. PCT/CN2017/070325, dated Aug. 29, 2017.
ERICSSON: "TBS scaling for short TTI", 3GPP Draft; R1-1610344, 3rd Generation Partnership Project (3GPP), Mobile Competence Centre; 650, Route Des Lucioles; F-06921 Sopgia-Antipolis Cedex ; France, vol. RAN WG1, no. Lisbon, Portugal; Oct. 10, 2016-Oct. 14, 2016 Sep. 30, 2016(Sep. 30, 2016), XP051158695, [retrieved on Sep. 30, 2016] * sections 2.1, 2.2, 2.3.2*.
MOTOROLA: "Details of transport block sizes mapped to three and four layers", 3GPP Draft; R1-105621 TBS VFINAL1,3rd Generation Partnershif Project(3GPP), Mobile Competence Centre; 650, Route Deslucioles; F-06921 Sophia-Antipolis Cedex; France, vol. RAN WG1, no. Xi' an;Oct. 11, 2010,Oct. 14, 2010(Oct. 14, 2010), XP050462826, [retrieved on Oct. 14, 2010] * sections 2.1,2.2, Annex B.* .
Supplementary European Search Report in the European application No. 17890784.6, dated Nov. 22, 2019.
First Office Action of the Chilean application No. 201901875, dated Apr. 20, 2020.
First Office Action of the Chinese application No. 201780081506.1, dated May 7, 2020.
First Office Action of the Russian application No. 2019124632, dated Jun. 3, 2020.
English translation of the Witten Opinion of the International Search Authority in the international application No. PCT/CN2017/070325, dated Aug. 29, 2017.
Notice of Allowance of the Chinese application No. 201780081506.1, dated Oct. 21, 2020.
First Office Action of the Indian application No. 201917029490, dated Oct. 27, 2020.
First Office Action of the Japanese application No. 2019-536454, dated Dec. 18, 2020.

* cited by examiner

300

A network device determines an MCS grade for transmitting a target transport block ∽ 310

The network device determines, according to the MCS grade as well as a TBS mapping relationship when a preset first resource parameter is met, a first TBS corresponding to the MCS grade ∽ 320

The network device determines a second TBS according to the first TBS and a second resource parameter for transmitting the target transport block ∽ 330

The network device sends the target transport block to the terminal device according to the second TBS, or receives the target transport block, which is sent by the terminal device according to the second TBS ∽ 340

FIG. 3

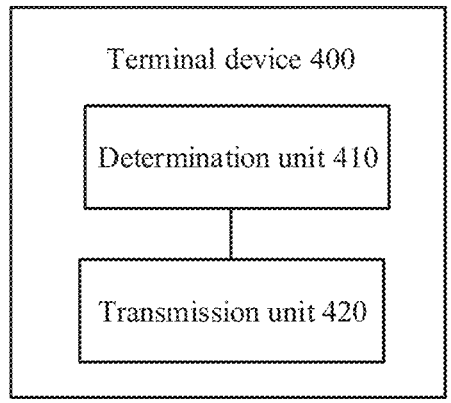

FIG. 4

METHOD FOR TRANSMITTING DATA, TERMINAL DEVICE AND NETWORK DEVICE

CROSS-REFERENCE TO RELATED APPLICATION

The present application is the U.S. national phase application of PCT Application No. PCT/CN2017/070325 filed on Jan. 5, 2017, the disclosure of which is incorporated herein in its entirety by reference.

TECHNICAL FIELD

The embodiments of the disclosure relate to the field of wireless communication, and in particular to a method for transmitting data, a terminal device and a network device.

BACKGROUND

In a Long Term Evolution (abbreviated as "LTE") system, when data are scheduled by a network side for transmission, information of a Modulation and Coding Scheme (abbreviated as "MCS") will be carried in Downlink Control Information (abbreviated as "DCI"). Meanwhile, a mapping relationship indicated by indication information between MCSs and Transport Block Sizes (abbreviated as "TBSs") is agreed by the network side with a terminal side in advance. The terminal device may obtain a corresponding TBS according to the indication information and the mapping relationship and thus performs data transmission with the network device by using the TBS.

However, in an existing 5th-Generation (5G) system or a New Radio (abbreviated as "NR") system, there are various values of resource parameters for transmitting the data. For example, when one transport block is transmitted, it is possible that the number of used Physical Resource Blocks (PRBs) is more abundant than the number of RPBs used in the LTE system. In data transmission, not only is a subframe taken as a unit, but also a mini-time slot, a time slot, an aggregation time slot and the like can be flexibly taken as a transmission unit of a time domain resource. The number of mapping layers in one transport block may be greater than that in the LTE system. Under a condition in which different resource parameters such as the number of PRBs, a time-domain resource unit and the number of transmission layers change flexibly. corresponding TBSs also change constantly. In the LTE system, the determined TBS method cannot meet the requirement of determining the TBS information under a condition in which a value range of resource parameters is large.

SUMMARY

The embodiments of the disclosure provide a method for transmitting data, a terminal device and a network device, which can effectively acquire information of a TBS for transmitting the data under a condition in which a value range of resource parameters for transmitting the data is large.

A first aspect provides a method for transmitting data, which may include the following operations.

A terminal device determines an MCS grade for transmitting a target transport block.

The terminal device determines, according to the MCS grade as well as a TBS mapping relationship when a preset first resource parameter is met, a first TBS corresponding to the MCS grade, wherein the TBS mapping relationship includes a mapping relationship between MCS grades and TBSs.

The terminal device determines a second TBS according to the first TBS and a second resource parameter for transmitting the target transport block.

The terminal device sends the target transport block to the network device according to the second TBS, or receives the target transport block, which is sent by the network device according to the second TBS.

Therefore, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, the implementation complexity of the terminal device is low, and it is very easy for the terminal device to achieve forward compatibility to expand to a larger transmission resource range for use. For example, the terminal device is expanded to a wider range of time domain resources, frequency domain resources or number of transmission layers.

Optionally, the first resource parameter may include at least one of: a first time domain resource parameter, a first frequency domain resource parameter, a first time frequency resource parameter or a first number of transmission layers.

Further, the first time domain resource parameter may include number of time domain Resource Elements (REs) used when the target transport block is transmitted, and each of the time domain REs may be, for example, an Orthogonal Frequency Division Multiplexing (OFDM) symbol, a time slot, a mini-time slot or a subframe, etc.; the first frequency domain resource parameter may include the number of frequency domain REs used when the target transport block is transmitted, and each of the frequency domain REs may be, for example, a sub-carrier, a PRB, a sub-band or a carrier, etc.; the first time frequency resource parameter may include the number of time frequency REs used when the target transport block is transmitted, and each of the time frequency REs is a basic unit for transmitting the data; and the first number of transmission layers may include the number of transmission layers mapped by the target transport block.

It should be understood that the first resource parameter is a preset resource parameter, and the TBS mapping relationship is a TBS mapping relationship at the preset first resource parameter. For example, the first resource parameter may be a resource parameter agreed in a protocol, and the TBS mapping relationship is a mapping relationship between an MCS grade meeting the agreed resource parameter and a TBS.

It should be further understood that a TBS mapping relationship table of the terminal device for determining the first TBS may include TBS mapping relationships at a plurality of first resource parameters simultaneously, e.g., the shown table 1 simultaneously includes TBS mapping relationships at three numbers of OFDM symbols, and may also only include a TBS mapping relationship at one first resource parameter, e.g., it may only include the TBS mapping relationship when the number of OFDM symbols is 1, which is not defined thereto in the embodiments of the disclosure.

If the TBS mapping relationship table of the terminal device for determining the first TBS simultaneously includes the TBS mapping relationships at the plurality of first resource parameters, e.g., the shown table 1 simultaneously includes the TBS mapping relationships at three numbers of OFDM symbols, when the terminal device determines the first TBS, the terminal device may select one of the three first resource parameters (the number of OFDM symbols is 1, the number of OFDM symbols is 2 and the number of OFDM symbols is 7) to determine the first TBS. The terminal device may randomly select any one of the three first resource parameters, and may also select, according to a second resource parameter for transmitting the target transport block, the first resource block most matched with the second resource parameter, thus determining the first TBS corresponding to the MCS of the target transport block according to a TBS mapping relationship at the selected first resource parameter.

In addition, the TBS mapping relationship may further be a preset TBS mapping relationship at a plurality of first resource parameters, e.g., the TBS mapping relationship may be a TBS mapping relationship between physical resources corresponding to preset first time domain resource parameter and first frequency domain resource parameter and the number of transmission layers (i.e., the first number of transmission layers). The preset first resource parameter may be a resource parameter agreed between the network device and the terminal device in advance.

Optionally, in an implementation manner of the first aspect, the operation that the terminal device determines a second TBS according to the first TBS and a second resource parameter for transmitting the target transport block may include the following operation: the terminal device determines the second TBS according to a numerical relationship between the second resource parameter and the first resource parameter as well as the first TBS.

Optionally, the second resource parameter may include at least one of: a second time domain resource parameter, a second frequency domain resource parameter, a second time frequency resource parameter or a second number of transmission layers.

Further, the second time domain resource parameter includes the number of time domain REs used when the target transport block is transmitted, and each of the time domain REs is an OFDM symbol, a time slot, a mini-time slot or a subframe; the second frequency domain resource parameter includes the number of frequency domain REs used when the target transport block is transmitted, and each of the frequency domain REs is a sub-carrier, a PRB, a sub-band or a carrier, the second time frequency resource parameter includes the number of time frequency REs used when the target transport block is transmitted; and the second number of transmission layers includes the number of transmission layers mapped by the target transport block.

It is assumed that the value of the second resource parameter is N, the value of the first resource parameter is M and the first TBS determined by the terminal device according to the TBS mapping relationship at the first resource parameter is TBS 1, the second TBS may be calculated via the following manner: TBS 2=(N/M)*TBS 1, or the TBS 2 is an integer by rounding up based on the (N/M)*TBS 1, or the TBS 2 is an integer by rounding down based on the (N/M)*TBS 1, where, for example, the N is the number of time domain REs used when the target transport block is transmitted, and the M is a first time domain resource parameter, i.e., the number of time domain REs; or the N is the number of frequency domain REs used when the data transport block is transmitted, and the M is a first frequency domain resource parameter, i.e., the number of frequency domain REs; or the N is a value on the number of second transmission layers, and the M is a value on the number of first transmission layers.

In a more universal condition, the first resource parameter is a unit resource parameter. For example, the first resource parameter is an OFDM symbol, a time slot, a PRB and single-layer transmission, etc. At this moment, the terminal device may directly determine the second TBS according to the second resource parameter and the first TBS.

Optionally, in an implementation manner of the first aspect, the operation that the terminal device determines a second TBS according to the first TBS and a second resource parameter for transmitting the target transport block may include the following operations: the terminal device determines, according to the second resource parameter as well as a mapping relationship between resource parameters and resource coefficients, a resource coefficient corresponding to the second resource parameter; and the terminal device performs, according to the resource coefficient corresponding to the second resource parameter, data processing on the first TBS to obtain the second TBS.

The mapping relationship between the resource parameters and the resource coefficients may be determined by the network device and is notified to the terminal device, and may also be agreed between the network device and the terminal device in advance. The resource coefficient is a TBS conversion coefficient at different resource parameters. Since the numbers of physical REs corresponding to different second resource parameters and capable of being used for transmitting the target transport block are different, the resource coefficient is introduced to indicate a TBS conversion condition under a condition of different numbers of REs. The resource coefficient is used for adjusting the size of the transport block. For example, the resource coefficient is used for adjusting the size of the first TBS to obtain the second TBS.

It should be understood that the resource coefficient may also be obtained based on the second resource parameter and other resource parameters. For example, a basic resource coefficient is obtained according to the second resource parameter, and then a final resource coefficient is obtained in combination with other resource parameters. For example, when the terminal device is provided with a Beam Reference Signal (BRS) or a Channel State Indication Reference Signal (CSI-RS) for transmission on a time domain resource for transmitting the target transport block, the terminal device may multiply a preset factor to a basic resource coefficient obtained according to the second resource parameter to obtain the resource coefficient. When the BRS or the CSI-RS is not provided for transmission, the factor does not need to be multiplied. Also for example, when the terminal device is provided with a reservation resource on a time domain resource for transmitting the target transport block, according to the size of the reservation resource, a factor corresponding to the size of the reservation resource may be obtained, and a basic resource coefficient obtained according to the second resource parameter is multiplied with the factor to obtain the resource coefficient.

Optionally, in an implementation manner of the first aspect, the operation that the terminal device determines a second TBS according to the first TBS and a second resource parameter for transmitting the target transport block may include the following operations: the terminal device determines a third TBS according to the second resource parameter and the first TBS; and the terminal device determines a maximum TBS in TBSs, that are smaller than or equal to the third TBS and equal to an integral multiple of a preset value, as the second TBS, or determines a minimum TBS in TBSs, that are greater than or equal to the third TBS and equal to the integral multiple of the preset value, as the second TBS; or determines, as the second TBS, a TBS having a minimum absolute value of a difference with the third TBS in TBSs that are equal to the integral multiple of the preset value.

In some conditions, since the basic unit for transmitting the data is fixed, it is required that the size of the transport block is some fixed value or an integral multiple of the fixed value. For example, the byte is taken as the unit for transmitting the data and one byte is equal to 8 bits, so the TBS is 8 or an integral multiple of the 8. At this moment, the terminal device needs to determine the third TBS according to the second resource parameter and the first TBS and determines the second TBS equal to 8 or the integral multiple of the 8 according to the third TBS.

Optionally, in an implementation manner of the first aspect, the operation that the terminal device determines a third TBS according to the second resource parameter and the first TBS may include the following operation: the terminal device determines the third TBS according to a numerical relationship between the second resource parameter and the first resource parameter as well as the first TBS.

Optionally, in an implementation manner of the first aspect, the operation that the terminal device determines a third TBS according to the second resource parameter and the first TBS may include the following operations: the terminal device determines, according to the second resource parameter as well as a mapping relationship between resource parameters and resource coefficients, a resource coefficient corresponding to the second resource parameter; and the terminal device performs, according to the resource coefficient corresponding to the second resource parameter, data processing on the first TBS to obtain the third TBS.

Optionally, in an implementation manner of the first aspect, before the operation that a terminal device determines an MCS grade for transmitting a target transport block, the method may further include the following operation: the terminal device receives indication information from the network device, wherein the indication information indicates the MCS grade.

A second aspect provides a method for transmitting data, which may include the following operations.

A network device determines an MCS grade for transmitting a target transport block.

The network device determines, according to the MCS grade as well as a TBS mapping relationship when a preset first resource parameter is met, a first TBS corresponding to the MCS grade, wherein the TBS mapping relationship includes a mapping relationship between MCS grades and TBSs.

The network device determines a second TBS according to the first TBS and a second resource parameter for transmitting the target transport block.

The network device sends the target transport block to a terminal according to the second TBS, or receives the target transport block, which is sent by the terminal device according to the second TBS.

Therefore, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, it is very easy for the network device to achieve forward compatibility to expand to a larger transmission resource range for use. For example, the network device is expanded to a wider range of time domain resources, frequency domain resources or number of transmission layers.

Optionally, the first resource parameter may include at least one of: a first time domain resource parameter, a first frequency domain resource parameter, a first time frequency resource parameter or a first number of transmission layers.

Further, the first time domain resource parameter may include the number of time domain REs used when the target transport block is transmitted, and each of the time domain REs may be, for example, an OFDM symbol, a time slot, a mini-time slot or a subframe, etc.; the first frequency domain resource parameter may include the number of frequency domain REs used when the target transport block is transmitted, and each of the frequency domain REs may be, for example, a sub-carrier, a PRB, a sub-band or a carrier, etc.; the first time frequency resource parameter may include the number of time frequency REs used when the target transport block is transmitted, and each of the time frequency REs is a basic unit for transmitting the data; and the first number of transmission layers may include the number of transmission layers mapped by the target transport block.

It should be understood that the first resource parameter is a preset resource parameter, and the TBS mapping relationship is a TBS mapping relationship at the preset first resource parameter. For example, the first resource parameter may be a resource parameter agreed in a protocol, and the TBS mapping relationship is a mapping relationship between an MCS grade meeting the agreed resource parameter and a TBS.

It should be further understood that a TBS mapping relationship table of the network device for determining the first TBS may include TBS mapping relationships at a plurality of first resource parameters simultaneously, e.g., the shown table 1 simultaneously includes TBS mapping relationships at three numbers of OFDM symbols, and may also only include a TBS mapping relationship at one first resource parameter, e.g., it may only include the TBS mapping relationship when the number of OFDM symbols is 1, which is not defined thereto in the embodiments of the disclosure.

If the TBS mapping relationship table of the network device for determining the first TBS simultaneously includes the TBS mapping relationships at the plurality of first resource parameters, e.g., the shown table 1 simultaneously includes the TBS mapping relationships at three numbers of OFDM symbols, when the terminal device determines the first TBS, the terminal device may select one of the three first resource parameters (the number of OFDM symbols is 1, the number of OFDM symbols is 2 and the number of OFDM symbols is 7) to determine the first TBS. The network device may randomly select any one of the three first resource parameters, and may also select, according to a second resource parameter for transmitting the target transport block, the first resource block most matched with the second resource parameter, thus determining the first TBS corresponding to the MCS of the target transport block according to a TBS mapping relationship at the selected first resource parameter.

In addition, the TBS mapping relationship may further be a preset TBS mapping relationship at a plurality of first resource parameters, e.g., the TBS mapping relationship may be a TBS mapping relationship between physical resources corresponding to preset first time domain resource parameter and first frequency domain resource parameter and the number of transmission layers (i.e., the first number of transmission layers). The preset first resource parameter may be a resource parameter agreed between the network device and the terminal device in advance.

Optionally, in an implementation manner of the second aspect, the operation that the network device determines a second TBS according to the first TBS and a second resource parameter for transmitting the target transport block may include the following operation: the network device determines the second TBS according to a numerical relationship between the second resource parameter and the first resource parameter as well as the first TBS.

Optionally, the second resource parameter may include at least one of: a second time domain resource parameter, a second frequency domain resource parameter, a second time frequency resource parameter or a second number of transmission layers.

Further, the second time domain resource parameter includes the number of time domain REs used when the target transport block is transmitted, and each of the time domain REs is an OFDM symbol, a time slot, a mini-time slot or a subframe; the second frequency domain resource parameter includes the number of frequency domain REs used when the target transport block is transmitted, and each of the frequency domain REs is a sub-carrier, a PRB, a sub-band or a carrier; the second time frequency resource parameter includes the number of time frequency REs used when the target transport block is transmitted; and the second number of transmission layers includes the number of transmission layers mapped by the target transport block.

It is assumed that the value of the second resource parameter is N, the value of the first resource parameter is M and the first TBS determined by the network device according to the TBS mapping relationship at the first resource parameter is TBS 1, the second TBS may be calculated via the following manner: TBS 2=(N/M)*TBS 1, or the TBS 2 is an integer by rounding up based on the (N/M)*TBS 1, or the TBS 2 is an integer by rounding down based on the (N/M)*TBS 1, where, for example, the N is the number of time domain REs used when the target transport block is transmitted, and the M is a first time domain resource parameter, i.e., the number of time domain REs; or the N is the number of frequency domain REs used when the data transport block is transmitted, and the M is a first frequency domain resource parameter, i.e., the number of frequency domain REs; or the N is a value on the number of second transmission layers, and the M is a value on the number of first transmission layers.

Under a more universal condition, the first resource parameter is a unit resource parameter. For example, the first resource parameter is an OFDM symbol, a time slot, a PRB and single-layer transmission, etc. At this moment, the network device may directly determine the second TBS according to the second resource parameter and the first TBS.

Optionally, in an implementation manner of the second aspect, the operation that the network device determines a second TBS according to the first TBS and a second resource parameter for transmitting the target transport block may include the following operations: the network device determines, according to the second resource parameter as well as a mapping relationship between resource parameters and resource coefficients, a resource coefficient corresponding to the second resource parameter; and the network device performs, according to the resource coefficient corresponding to the second resource parameter, data processing on the first TBS to obtain the second TBS.

The mapping relationship between the resource parameters and the resource coefficients may be determined by the network device and is notified to the terminal device, and may also be agreed between the network device and the terminal device in advance. The resource coefficient is a TBS conversion coefficient at different resource parameters. Since the numbers of physical REs corresponding to different second resource parameters and capable of being used for transmitting the target transport block are different, the resource coefficient is introduced to indicate a TBS conversion condition under a condition of different numbers of REs. The resource coefficient is used for adjusting the size of the transport block. For example, the resource coefficient is used for adjusting the size of the first TBS to obtain the second TBS.

It should be understood that the resource coefficient may also be obtained based on the second resource parameter and other resource parameters. For example, a basic resource coefficient is obtained according to the second resource parameter, and then a final resource coefficient is obtained in combination with other resource parameters. For example, when the network device provides a BRS or a CSI-RS for the terminal device on a time domain resource for transmitting the target transport block for transmission, the network device may multiply a preset factor to a basic resource coefficient obtained according to the second resource parameter to obtain the resource coefficient. When the BRS or the CSI-RS is not provided by the network device for the terminal device for transmission, the factor does not need to be multiplied. Also for example, when the network device provides a reservation resource for the terminal device on a time domain resource for transmitting the target transport block, the network device may multiply, according to the size of the reservation resource, a factor corresponding to the size of the reservation resource, and enable a basic resource coefficient obtained according to the second resource parameter to multiply with the factor to obtain the resource coefficient.

Optionally, in an implementation manner of the second aspect, the operation that the network device determines a second TBS according to the first TBS and a second resource parameter for transmitting the target transport block may include the following operations: the network device determines a third TBS according to the second resource parameter and the first TBS; and the network device determines a maximum TBS in TBSs, that are smaller than or equal to the third TBS and equal to an integral multiple of a preset value, as the second TBS; or determines a minimum TBS in TBSs, that are greater than or equal to the third TBS and equal to the integral multiple of the preset value, as the second TBS; or determines, as the second TBS, a TBS having a minimum absolute value of a difference with the third TBS in TBSs that are equal to the integral multiple of the preset value.

In some conditions, since the basic unit for transmitting the data is fixed, it is required that the size of the transport block is some fixed value or an integral multiple of the fixed value. For example, the byte is taken as the unit for transmitting the data and one byte is equal to 8 bits, so the TBS is 8 or an integral multiple of the 8. At this moment, the network device needs to determine the third TBS according to the second resource parameter and the first TBS and determines the second TBS equal to 8 or the integral multiple of the 8 according to the third TBS.

Optionally, in an implementation manner of the second aspect, the operation that the network device determines a third TBS according to the second resource parameter and the first TBS may include the following operation: the network device determines the third TBS according to a numerical relationship between the second resource parameter and the first resource parameter as well as the first TBS.

Optionally, in an implementation manner of the second aspect, the operation that the network device determines a third TBS according to the second resource parameter and the first TBS may include the following operations: the network device determines, according to the second resource parameter as well as a mapping relationship between resource parameters and resource coefficients, a resource coefficient corresponding to the second resource parameter; and the network device performs, according to the resource coefficient corresponding to the second resource parameter, data processing on the first TBS to obtain the third TBS.

Optionally, in an implementation manner of the second aspect, the method may further include the following operation: the network device sends indication information to the terminal device, wherein the indication information indicates the MCS grade.

A third aspect provides a terminal device; and the terminal device may execute the operations of the terminal device in the first aspect or any optional implementation manner of the first aspect. Specifically, the terminal device may include a modular unit configured to execute the operations of the terminal device in the first aspect or any optional implementation manner of the first aspect.

A fourth aspect provides a network device; and the network device may execute the operations of the network device in the second aspect or any optional implementation manner of the second aspect. Specifically, the network device may include a modular unit configured to execute the operations of the network device in the second aspect or any optional implementation manner of the second aspect.

A fifth aspect provides a terminal device, which may include: a processor, a transceiver and a memory. The processor, the transceiver and the memory are communicated to each other via an internal connection passageway. The memory is configured to store an instruction, and the processor is configured to execute the instruction stored by the memory. When the processor executes the instruction stored by the memory, the terminal device executes the method in the first aspect or any possible implementation manner of the first aspect via the execution, or the terminal device implements the terminal device provided by the third aspect via the execution.

A sixth aspect provides a network device, which may include: a processor, a transceiver and a memory. The processor, the transceiver and the memory are communicated to each other via an internal connection passageway. The memory is configured to store an instruction, and the processor is configured to execute the instruction stored by the memory. When the processor executes the instruction stored by the memory, the network device executes the method in the second aspect or any possible implementation manner of the second aspect via the execution, or the network device implements the network device provided by the fourth aspect via the execution.

A seventh aspect provides a computer readable storage medium, which stores a program; and with the program, the network device executes any method for transmitting the data in the first aspect and various implementation manners thereof.

An eighth aspect provides a computer readable storage medium, which stores a program; and with the program, the network device executes any method for transmitting the data in the second aspect and various implementation manners thereof.

A ninth aspect provides a system chip, which may include an input interface, an output interface, a processor and a memory; the processor is configured to execute an instruction stored by the memory; and when the instruction is executed, the processor may implement any method in the first aspect and various implementation manners thereof.

A tenth aspect provides a system chip, which may include an input interface, an output interface, a processor and a memory; the processor is configured to execute an instruction stored by the memory; and when the instruction is executed, the processor may implement any method in the second aspect and various implementation manners thereof.

BRIEF DESCRIPTION OF DRAWINGS

FIG. 3 illustrates a schematic flowchart of a method for transmitting data according to an embodiment of the disclosure.

FIG. 4 illustrates a schematic block diagram of a terminal device according to an embodiment of the disclosure.

DETAILED DESCRIPTION

The technical solutions in the embodiments of the disclosure will be described below in combination with the accompanying drawings.

It should be understood that the technical solutions in the embodiments of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a Long Term Evolution (abbreviated as "LTE") system, an LTE Frequency Division Duplex (abbreviated as "FDD") system, an LTE Time Division Duplex (abbreviated as "TDD") system, a Universal Mobile Telecommunication System (abbreviated as "UMTS") system and future 5G communication system, etc.

Each embodiment is described in the disclosure in combination with the terminal device. The terminal device may also be User Equipment (abbreviated as "UE"), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (abbreviated as "SIP") phone, a Wireless Local Loop (abbreviated as "WLL")

station, a Personal Digital Assistant (abbreviated as "PDA"), a handheld device having a wireless communication function, a computing device or other processing devices, vehicle-amounted devices and wearable devices connected to a wireless modulator-demodulator, a terminal device in a future 5G network or a terminal device in a future evolved Public Land Mobile Network (PLMN) network, etc.

Each embodiment is described in the disclosure in combination with the network device. The network device may be a device used for communicating with the terminal device, and may be, for example, a Base Transceiver Station (abbreviated as "BTS") in a GSM or CDMA, may also be a NodeB (abbreviated as "NB") in a WCDMA system, and may further be an Evolutional NodeB (abbreviated as "eNB" or "eNodeB") in an LTE system; or the network device may be a relay station, an access point, a vehicle-amounted device, a wearable device as well as a network side device in the future 5G system or a network side device in the future evolved PLMN network.

Figures 1, 2:
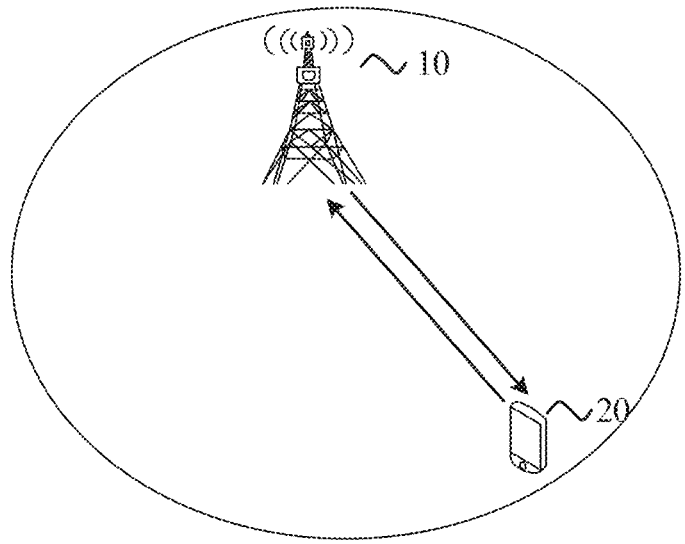
FIG. 1 illustrates a schematic architecture diagram of an application scenario according to an embodiment of the disclosure.
FIG. 2 illustrates a schematic flowchart of a method for transmitting data according to an embodiment of the disclosure.

FIG. 1 illustrates a schematic diagram of an application scenario according to an embodiment of the disclosure. The communication system in FIG. 1 may include a network device 10 and a terminal device 20. The network device 10 is configured to provide a communication service for the terminal device 20 and is accessed to a core network. The terminal device 20 may be accessed to a network by searching a synchronization signal, a broadcast signal and the like sent by the network device 10 to communicate with the network. The arrows shown in FIG. 1 may indicate uplink/downlink transmission of a cellular link between the terminal device 20 and the network device 10.

The network in this embodiment of the disclosure may be a Public Land Mobile Network (abbreviated as "PLMN") or a Device to Device (abbreviated as "D2D") network or a Machine to Machine/Man (abbreviated as "M2M") network or other networks. The FIG. 1 is a simplified schematic diagram for example. The network may further include other terminal devices, which is not drawn in FIG. 1.

FIG. 2 illustrates a schematic flowchart of a method 200 for transmitting data according to an embodiment of the disclosure. The method 200 is executed by a terminal device. As illustrated in FIG. 2, the specific process for transmitting the data may include the following operations.

At 210, a terminal device determines an MCS grade for transmitting a target transport block.

For example, the terminal device may directly determine the MCS grade according to a service type; or the terminal device acquires, by receiving indication information sent by a network device, the MCS grade indicated by the indication information, e.g., the terminal device may receive the indication information from the network device and bearing in Download Control Information (abbreviated as "DCI") used to schedule a data transport block. The indication information may directly indicate the MCS grade, and may also indicate an MCS index, wherein different MCS indexes correspond to different MCS grades.

At 220, the terminal device determines, according to the MCS grade as well as a TBS mapping relationship when a preset first resource parameter is met, a first TBS corresponding to the MCS grade.

Herein, the TBS mapping relationship includes a mapping relationship between MCS grades and TBSs. Upon the determination of the MCS grade for transmitting the target transport block, the terminal device may determine, according to the MCS grade, a TBS (i.e., the first TBS) corresponding to the MCS grade.

It should be understood that the first resource parameter is a preset resource parameter, and the TBS mapping relationship is a TBS mapping relationship at the preset first resource parameter. For example, the first resource parameter may be a resource parameter agreed in a protocol, and the TBS mapping relationship is a mapping relationship between an MCS grade meeting the agreed resource parameter and a TBS.

Optionally, the first resource parameter may include at least one of: a first time domain resource parameter, a first frequency domain resource parameter, a first time frequency resource parameter or a first number of transmission layers.

For example, the first resource parameter is the first time domain resource parameter, the first frequency domain resource parameter, the first time frequency resource parameter and the first number of transmission layers respectively, and the TBS mapping relationship when the first resource parameter is met will be described below in detail.

Case 1

In a case where the first resource parameter is the first time domain resource parameter, the TBS mapping relationship is a TBS mapping relationship when the first time domain resource parameter is met, i.e., a mapping relationship between the MCS grade and the first TBS when the first time domain resource parameter is met.

The first time domain resource parameter includes the number of time domain REs used when the target transport block is transmitted, and each of the time domain REs may be, for example, an Orthogonal Frequency Division Multiplexing (abbreviated as "OFDM") symbol, a 50 time slot, a mini-time slot and a subframe, etc.

For example, the first time domain resource may be N subframes, N time slots, N mini-time slots or N OFDM symbols, wherein the N is an agreed positive integer value and typically N=1 or 7.

For example, the first time domain resource parameter is the number of OFDM symbols and is as shown in table 1. The table 1 illustrates a TBS mapping relationship under a condition in which the first time domain resource parameter is one OFDM symbol, two OFDM symbols and seven OFDM symbols.

TABLE 1

| MCS grade | First time domain resource parameter (the number of OFDM symbols) | | |
|---|---|---|---|
| | 1 | 2 | 7 |
| 0 | TBS 01 | TBS 02 | TBS 03 |
| 1 | TBS 11 | TBS 12 | TBS 13 |
| 2 | TBS 21 | TBS 22 | TBS 23 |
| 3 | TBS 31 | TBS 32 | TBS 33 |
| 4 | TBS 41 | TBS 42 | TBS 43 |
| 5 | TBS 51 | TBS 52 | TBS 53 |
| 6 | TBS 61 | TBS 62 | TBS 63 |
| 7 | TBS 71 | TBS 72 | TBS 73 |

It is to be noted that the table 1 simultaneously illustrates the TBS mapping relationship under the condition in which the first time domain resource parameter is one OFDM symbol, two OFDM symbols and seven OFDM symbols. When the terminal device determines the first TBS, the terminal device may select one of three first resource parameters (the number of OFDM symbols is 1, the number of OFDM symbols is 2 and the number of OFDM symbols is 7) to determine the first TBS, e.g., the terminal device may randomly select any one of the three first resource parameters, and may also select, according to a second resource parameter for transmitting the target transport block, a first resource parameter most matched with the second resource parameter, thus determining the first TBS corresponding to the MCS of the target transport block according to the TBS mapping relationship at the selected first resource parameter.

It is assumed that the terminal device selects the first time domain resource parameter as two OFDM symbols, the terminal device determines the first TBS according to the TBS mapping relationship under the condition in which the number of OFDM symbols is 2. For example, in a case where the terminal device determines that the MCS grade is 3, it is determined that the first TBS corresponding to the MSC grade 3 is TBS 32 according to the TBS mapping relationship under the condition in which the number of OFDM symbols is 2.

It is assumed that the second resource parameter of the terminal device for transmitting the target transport block at present is 14 OFDM symbols, in view of a multiple relationship and a minimum multiple value between the 14 OFDM symbols and the 7 OFDM symbols and in order to process the data subsequently, the terminal device selects the first time domain resource parameter as 7 OFDM symbols and the terminal device determines the first TBS according to the TBS mapping relationship under the condition in which the number of OFDM symbols is 7. For example, in a case where the terminal device determines that the MCS grade is 5, it is determined that the first TBS corresponding to the MSC grade 5 is TBS 53 according to the TBS mapping relationship under the condition in which the number of OFDM symbols is 7.

It should be understood that a TBS mapping relationship table of the terminal device for determining the first TBS may include TBS mapping relationships at a plurality of first resource parameters simultaneously, e.g., the above table simultaneously includes TBS mapping relationships at three numbers of OFDM symbols, and may also only include a TBS mapping relationship at one first resource parameter, e.g., it may only include the TBS mapping relationship when the number of OFDM symbols is 1.

Case 2

In a case where the first resource parameter is the first frequency domain resource parameter, the TBS mapping relationship is a TBS mapping relationship when the first frequency domain resource parameter is met, i.e., a mapping relationship between the MCS grade and the first TBS when the first frequency domain resource parameter is met.

The first frequency domain resource parameter includes the number of frequency domain REs used when the target transport block is transmitted, and each of the frequency domain REs may be, for example, a sub-carrier, a PRB, a sub-band and a carrier, etc.

For example, the first frequency domain resource may be M sub-carriers, or M PRBs, or a certain bandwidth, etc., wherein the M is an agreed positive integer value and typically M=1.

For example, the first frequency domain resource is the number of PRBs and is as shown in table 2. The table 2 illustrates the TBS mapping relationship when the first time domain resource parameter is one PRB.

TABLE 2

| MCS grade | First frequency domain resource parameter (the number of PRBs) 1 |
|---|---|
| 0 | TBS 01 |
| 1 | TBS 11 |

TABLE 2-continued

| MCS grade | First frequency domain resource parameter (the number of PRBs) 1 |
|---|---|
| 2 | TBS 21 |
| 3 | TBS 31 |
| 4 | TBS 41 |
| 5 | TBS 51 |
| 6 | TBS 61 |
| 7 | TBS 71 |

It is assumed that the terminal device selects the first time domain resource parameter as one PRB, the terminal device determines the first TBS according to the TBS mapping relationship under the condition in which the number of PRBs is 1. For example, in a case where the terminal device determines that the MCS grade is 2, it is determined that the first TBS corresponding to the MSC grade 2 is TBS 21 according to the TBS mapping relationship under the condition in which the number of PRBs is 1.

It should be understood that a TBS mapping relationship table of the terminal device for determining the first TBS may include TBS mapping relationships at a plurality of frequency domain resource parameters simultaneously. e.g., the above table simultaneously includes TBS mapping relationships at different numbers of PRBs, and may also only include a TBS mapping relationship at one frequency domain resource parameter, e.g., it may only include the TBS mapping relationship when the number of PRBs is 1.

Case 3

In a case where the first resource parameter is the first time frequency resource parameter, the TBS mapping relationship is a TBS mapping relationship when the first time frequency resource parameter is met, i.e., a mapping relationship between the MCS grade and the first TBS when the first time frequency resource parameter is met.

For example, the first time frequency resource parameter may include the number of time frequency Resource Elements (abbreviated as "REs") used when the target transport block is transmitted, etc.

For example, the first time frequency resource may be N REs, or one time slot and M PRBs, or N time slots and one PRB, or N time slots and M PRBs, etc.

For example, the first time frequency resource parameter is the number of REs and is as shown in table 3. Table 3 illustrates the TBS mapping relationship under a condition in which the first time frequency resource parameter is 50 REs, 100 REs, 200 REs, 300 REs and 400 REs.

TABLE 3

| MCS grade | First time domain resource parameter (the number of REs) | | | | |
|---|---|---|---|---|---|
| | 50 | 100 | 200 | 300 | 400 |
| 0 | TBS 00 | TBS 01 | TBS 02 | TBS 03 | TBS 04 |
| 1 | TBS 10 | TBS 11 | TBS 12 | TBS 13 | TBS 14 |
| 2 | TBS 20 | TBS 21 | TBS 22 | TBS 23 | TBS 24 |
| 3 | TBS 30 | TBS 31 | TBS 32 | TBS 33 | TBS 34 |
| 4 | TBS 40 | TBS 41 | TBS 42 | TBS 43 | TBS 44 |
| 5 | TBS 50 | TBS 51 | TBS 52 | TBS 53 | TBS 54 |
| 6 | TBS 60 | TBS 61 | TBS 62 | TBS 63 | TBS 64 |
| 7 | TBS 70 | TBS 71 | TBS 72 | TBS 73 | TBS 74 |

It is assumed that the terminal device selects the first time domain resource parameter as 100 REs, the terminal device determines the first TBS according to the TBS mapping relationship under the condition in which the number of REs is 100. For example, in a case where the terminal device determines that the MCS grade is 6, it is determined that the first TBS corresponding to the MSC grade 6 is TBS 61 according to the TBS mapping relationship under the condition in which the number of REs is 100.

It should be understood that a TBS mapping relationship table of the terminal device for determining the first TBS may include TBS mapping relationships at a plurality of time frequency resource parameters simultaneously, e.g., the above table simultaneously includes TBS mapping relationships at different numbers of REs, and may also only include a TBS mapping relationship at one time frequency resource parameter, e.g., it may only include the TBS mapping relationship when the number of REs is 50.

Case 4

In a case where the first resource parameter is the first number of transmission layers, the TBS mapping relationship is a TBS mapping relationship when the first number of transmission layers is met, i.e., a mapping relationship between the MCS grade and the first TBS when the first number of transmission layers is met. The first number of transmission layers includes the number of transmission layers mapped by a transport block.

For example, the TBS mapping relationship when the first number of transmission layers is met may be a mapping relationship between the MCS grade and the first TBS when the first number of transmission layers is met, and may also be a mapping relationship among the MCS grade, the number of REs and the first TBS when the first number of transmission layers is met. The first number of transmission layers may be a positive integer value such as $L=1$, $L=2$, $L=3$ and $L=4$.

For example, the first number of transmission layers is 1, and the table 4 illustrates the mapping relationship between the MCS grade and the first TBS when the number of REs is 20, 40, 80, 160 and 320 respectively under the condition in which the first number of transmission layers is 1.

TABLE 4

First number of transmission layers (L = 1)

| MCS grade | The number of REs | | | | |
| --- | --- | --- | --- | --- | --- |
| | 20 | 40 | 80 | 160 | 320 |
| 0 | TBS 00 | TBS 01 | TBS 02 | TBS 03 | TBS 04 |
| 1 | TBS 10 | TBS 11 | TBS 12 | TBS 13 | TBS 14 |
| 2 | TBS 20 | TBS 21 | TBS 22 | TBS 23 | TBS 24 |
| 3 | TBS 30 | TBS 31 | TBS 32 | TBS 33 | TBS 34 |
| 4 | TBS 40 | TBS 41 | TBS 42 | TBS 43 | TBS 44 |
| 5 | TBS 50 | TBS 51 | TBS 52 | TBS 53 | TBS 54 |
| 6 | TBS 60 | TBS 61 | TBS 62 | TBS 63 | TBS 64 |
| 7 | TBS 70 | TBS 71 | TBS 72 | TBS 73 | TBS 74 |

It is assumed that the terminal device selects the first time domain resource parameter as the first number of transmission layers $L=1$ and the number of selected REs is 20, the terminal device determines the first TBS according to the TBS mapping relationship under the condition in which the number of REs is 20 and $L=1$ shown in the table 4. For example, in a case where the terminal device determines that the MCS grade is 3, it is determined that the first TBS corresponding to the MSC grade 3 is TBS 30 according to the TBS mapping relationship under the condition in which the number of REs is 20.

It should be understood that the TBS mapping relationship table of the terminal device for determining the first TBS may be a mapping relationship between the MCS grade and the first TBS when the first number of transmission layers is met, and may also be a mapping relationship among the MCS grade, the number of REs and the first TBS when the first number of transmission layers is met. For example, when $L=1$, the TBS mapping relationship at different numbers of REs exists.

Except for the TBS mapping relationship in the above four cases, the TBS mapping relationship may further be a preset TBS mapping relationship at a plurality of first resource parameters, e.g., the TBS mapping relationship may be a TBS mapping relationship between physical resources corresponding to preset first time domain resource parameter and first frequency domain resource parameter and the number of transmission layers (i.e., the first number of transmission layers). The preset first resource parameter may be a resource parameter agreed between the network device and the terminal device in advance.

At 230, the terminal device determines a second TBS according to the first TBS and a second resource parameter for transmitting the target transport block.

Specifically, after the terminal device determines the first TBS corresponding to the MCS grade of the target transport block according to the TBS mapping relationship at the first resource parameter, the terminal device needs to determine the second TBS according to the second resource parameter for transmitting the target transport block and the determined first TBS, wherein the second TBS is a TBS for transmitting the target transport block. The first TBS is a preset TBS, and the second TBS is a TBS used to transmit the target transport block.

Optionally, the second resource parameter may include at least one of: a second time domain resource parameter, a second frequency domain resource parameter, a second time frequency resource parameter or a second number of transmission layers.

Further, the second time domain resource parameter may include the number of time domain REs used when the target transport block is transmitted, and each of the time domain REs may be, for example, an OFDM symbol, a time slot, a mini-time slot or a subframe, etc.; the second frequency domain resource parameter may include the number of frequency domain REs used when the target transport block is transmitted, and each of the frequency domain REs may be, for example, a sub-carrier, a PRB, a sub-band or a carrier, etc.; the second time frequency resource parameter may include the number of time frequency REs used when the target transport block is transmitted, and each of the time frequency REs is a basic unit for transmitting the data; and the second number of transmission layers may include the number of transmission layers mapped by the target transport block.

The operation that the terminal device determines a second TBS according to the first TBS and a second resource parameter for transmitting the target transport block may implemented via four manners, which will be described below in detail.

Manner 1

The operation that the terminal device determines a second TBS according to the first TBS and a second resource parameter for transmitting the target transport block may include the following operation: the terminal device determines the second TBS according to a numerical relationship between the second resource parameter and the first resource parameter as well as the first TBS.

Specifically, upon acquisition of the first TBS, the terminal device may determine the second TBS according to the first TBS as well as the numerical relationship between the second resource parameter for transmitting the target transport block and the preset first resource parameter.

It is assumed that the value of the second resource parameter is N, the value of the first resource parameter is M and the first TBS determined by the terminal device according to the TBS mapping relationship at the first resource parameter is TBS 1, the second TBS may be calculated via the following manner: TBS 2=(N/M)*TBS 1, or the TBS 2 is an integer by rounding up based on the (N/M)*TBS 1, or the TBS 2 is an integer by rounding down based on the (N/M)*TBS 1, where, for example, the N is the number of time domain REs used when the target transport block is transmitted, and the M is a first time domain resource parameter, i.e., the number of time domain REs; or the N is the number of frequency domain REs used when the data transport block is transmitted, and the M is a first frequency domain resource parameter, i.e., the number of frequency domain REs; or the N is a value on the number of second transmission layers, and the M is a value on the number of first transmission layers.

Manner 2

In a more universal condition, the first resource parameter is a unit resource parameter. For example, the first resource parameter is an OFDM symbol, a time slot, a PRB and single-layer transmission, etc. At this moment, the terminal device may directly determine the second TBS according to the second resource parameter and the first TBS.

For example, the first resource parameter is a time domain resource unit, the second resource parameter is a second time domain resource parameter, the number of included time domain resource units is K1 and the first TBS determined by the terminal device is TBS 1, the value TBS 2 of the second TBS may be calculated via the following manner: TBS 2=K1*TBS 1.

Also for example, the first resource parameter is a frequency domain resource unit, the second resource parameter is a second frequency domain resource parameter, the number of included frequency domain resource units is K2 and the first TBS determined by the terminal device is TBS 1, the second TBS may be calculated via the following manner: TBS 2=K2*TBS 1.

Also for example, the first resource parameter is that the number of transmission layers is equal to 1, the second resource parameter is that the number of transmission layers is equal to K3, and the first TBS determined by the terminal device is TBS 1, the second TBS may be calculated via the following manner: TBS 2=K3*TBS 1.

Also for example, the first resource parameter is a time frequency resource unit, the second resource parameter is a second time frequency resource parameter, the number of included time domain resource units is P, the number of frequency domain resource units is Q and the first TBS determined by the terminal device is TBS 1, the second TBS may be calculated via the following manner: TBS 2=P*Q*TBS 1.

It should be understood that the first resource parameter and the second resource parameter may be a same type of resource parameters, e.g., the first resource parameter and the second resource parameter are time domain resource parameters; and the first resource parameter and the second resource parameter may also include different types of resource parameters. For example, the first resource parameter includes a frequency domain resource parameter and a time domain resource parameter, and the second resource parameter is the time domain resource parameter; at this moment, the frequency domain resource parameter in the first resource parameter may be a unit frequency domain resource parameter such as 1 PRB.

Manner 3

The operation that the terminal device determines a second TBS according to the first TBS and a second resource parameter for transmitting the target transport block may include the following operations: the terminal device determines, according to the second resource parameter as well as a mapping relationship between resource parameters and resource coefficients, a resource coefficient corresponding to the second resource parameter; and the terminal device performs, according to the resource coefficient corresponding to the second resource parameter, data processing on the first TBS to obtain the second TBS.

The mapping relationship between the resource parameters and the resource coefficients may be determined by the network device and is notified to the terminal device, and may also be agreed between the network device and the terminal device in advance. The resource coefficient is a TBS conversion coefficient at different resource parameters. Since the numbers of physical REs corresponding to different second resource parameters and capable of being used for transmitting the target transport block are different, the resource coefficient is introduced to indicate a TBS conversion condition under a condition of different numbers of REs. The resource coefficient is used for adjusting the size of the transport block. For example, the resource coefficient is used for adjusting the size of the first TBS to obtain the second TBS.

Specifically, the terminal device may first determine the resource coefficient corresponding to the second resource parameter according to the second resource parameter as well as the mapping relationship between the resource parameters and the resource coefficients, then acquire the first TBS and determine the second TBS according to the resource coefficient and the first TBS.

For example, in a case where the second resource parameter for transmitting the target transport block is N OFDM symbols, the first resource parameter is seven OFDM symbols and the mapping relationship between the resource parameters and the resource coefficients is as shown in table 5, the terminal device may determine a corresponding resource coefficient according to the table 5 and the second resource parameter, and determine the second TBS according to the resource coefficient and the first TBS. For example, in a case of the value N=4 of the second resource parameter, the terminal device may determine that the corresponding resource coefficient is 0.9 from the table, and thus the terminal device may determine the value TBS 2 of the second TBS according to the value TBS 1 of the first TBS and the resource coefficient, i.e., TBS 2=TBS 1*0.9; and in a case of the value N=7 of the second resource parameter, the corresponding resource coefficient is 1 and the second TBS is equal to the first Table 5

TABLE 5

| Value of second resource parameter | Resource coefficient |
|---|---|
| 2 | 0.8 |
| 4 | 0.9 |
| 7 | 1 |
| 14 | 1.1 |

Also for example, the second resource parameter for transmitting the target transport block is N PRBs, and the mapping relationship between the resource parameters and the resource coefficients is as shown in table 6. If the N is an odd number, the corresponding resource coefficient is 1. If the N is an even number, the corresponding resource coefficient is 0.8. For example, in a case of the value N=4 of the second resource parameter, the terminal device determines that the second TBS and the first TBS meet TBS 2=TRS 1*0.8.

TABLE 6

| Value of second resource parameter (number N) | Resource coefficient |
|---|---|
| Odd number | 1.0 |
| Even number | 0.8 |

Also for example, in a case where the number of transmission layers mapped by the target transport block is L, the first resource parameter is one layer, and the mapping relationship between the resource parameters and the resource coefficients is as shown in table 7, the terminal device may determine a corresponding resource coefficient according to the table 7 and the second resource parameter, and determine the second TBS according to the resource coefficient and the first TBS. For example, in a case of the value L=2 of the second resource parameter, the terminal device may determine that the corresponding resource coefficient is 1 from the table 7 and then the terminal device may determine that the second TBS is the same as the first TBS; and in a case of the value L=4 of the second resource parameter, the terminal device may determine that the corresponding resource coefficient is 0.95 from the table 7 and then the terminal device may determine the second TBS according to the first TBS and the resource coefficient, i.e., TBS 2=TBS 1*0.95.

TABLE 7

| Value of second resource parameter (number of layers L) | Resource coefficient |
|---|---|
| 1 | 1 |
| 2 | 1 |
| 3 | 0.95 |
| 4 | 0.95 |

It should be understood that the resource coefficient may also be obtained based on the second resource parameter and other resource parameters. For example, a basic resource coefficient is obtained according to the second resource parameter, and then a final resource coefficient is obtained in combination with other resource parameters. For example, when the terminal device is provided with a Beam Reference Signal (BRS) or Channel State Indication Reference Signals (CSI-RS) for transmission on a time domain resource for transmitting the target transport block, the terminal device may multiply a preset factor to a basic resource coefficient obtained according to the second resource parameter to obtain the resource coefficient. When the BRS or the CSI-RS is not provided for transmission, the factor does not need to be multiplied. Also for example, when the terminal device is provided with a reservation resource on a time domain resource for transmitting the target transport block, according to the size of the reservation resource, a factor corresponding to the size of the reservation resource may be obtained, and a basic resource coefficient obtained according to the second resource parameter is multiplied with the factor to obtain the resource coefficient.

It should be understood that in the manner 3, the terminal device obtains the second TBS by adjusting the first TBS according to the resource coefficient corresponding to the second resource parameter. The resource coefficient in this embodiment may also be used in the manner 1 and the manner 2 so as to adjust the first TBS determined by the terminal device to obtain the second TBS.

For example, it is assumed that the first resource parameter is a time domain resource unit, the second resource parameter is a second time domain resource parameter, the number of included time domain resource units is K1 and the first TBS determined by the terminal device is TBS 1, the value TBS 2 of the second TBS may be calculated via the following manner: TBS 2=K1*TBS 1.

Manner 4

The operation that the terminal device determines a second TBS according to the first TBS and a second resource parameter for transmitting the target transport block may include the following operations: the terminal device determines a third TBS according to the second resource parameter and the first TBS; and the terminal device determines a maximum TBS in TBSs, that are smaller than or equal to the third TBS and equal to an integral multiple of a preset value, as the second TBS; or determines a minimum TBS in TBSs, that are greater than or equal to the third TBS and equal to the integral multiple of the preset value, as the second TBS; or determines, as the second TBS, a TBS having a minimum absolute value of a difference with the third TBS in TBSs that are equal to the integral multiple of the preset value.

Specifically, in some conditions, since the basic unit for transmitting the data is fixed, it is required that the size of the transport block is some fixed value or an integral multiple of the fixed value. For example, the byte is taken as the unit for transmitting the data and one byte is equal to 8 bits, so the TBS is 8 or an integral multiple of the 8. At this moment, the terminal device needs to determine the third TBS according to the second resource parameter and the first TBS and determines the second TBS equal to 8 or the integral multiple of the 8 according to the third TBS.

The terminal device may determine the maximum TBS in the TBSs that are smaller than or equal to the third TBS and equal to the integral multiple of the preset value as the second TBS; or determines a minimum TBS in the TBSs that are greater than or equal to the third TBS and equal to the integral multiple of the preset value as the second TBS; or determines the TBS having the minimum absolute value of the difference with the third TBS in the TBSs equal to the integral multiple of the preset value as the second TBS.

For example, in a case where the third TBS determined by the terminal device is 50 bits and the preset value is 8, the terminal device may determine that the second TBS is 8*6=48 bits<50 bits; or the terminal device may determine that the second TBS is 8*7=56 bit>50 bit; or the terminal device judges |48-50|<|56-50| and thus determines that the second TBS is 48 bits.

Optionally, the operation that the terminal device determines a second TBS according to the first TBS and a second resource parameter for transmitting the target transport block may include the following operation: the terminal device determines the third TBS according to a numerical relationship between the second resource parameter and the first resource parameter as well as the first TBS.

Optionally, the operation that the terminal device determines a second TBS according to the first TBS and a second resource parameter for transmitting the target transport block may include the following operations: the terminal device determines, according to the second resource parameter as well as a mapping relationship between resource parameters and resource coefficients, a resource coefficient corresponding to the second resource parameter; and the terminal device performs, according to the resource coefficient corresponding to the second resource parameter, data processing on the first TBS to obtain the second TBS.

The process that the terminal device determines the third TBS according to the first TBS and the second resource parameter may be referred to the process that the terminal device determines the second TBS according to the first TBS and the second resource parameter in the foregoing manner 1 and manner 2, and will not be repeated for the briefness.

It should be understood that in the manner 4, the terminal device first determines the third TBS according to the second resource parameter and the first TBS and then further determines the second TBS meeting the conditions. In the foregoing three manners for determining the TBS, there is also a condition in which it is required that the size of the transport block is some fixed value or an integral multiple of the fixed value. For example, the byte is taken as the unit for transmitting the data and one byte is equal to 8 bits, so the TBS is 8 or an integral multiple of the 8. At this moment, it may also be implemented via the method in the manner 4, i.e., the terminal device first determines the third TBS and determines the second TBS according to the third TBS and a preset rule.

For example, it is assumed that the first resource parameter is a time domain resource unit, the second resource parameter is a second time domain resource parameter, the number of included time domain resource units is K1 and the first TBS determined by the terminal device is TBS 1, the terminal device first determines the value of the third TBS TBS 3=K1*TBS 1: and thereafter, the terminal device may, for example, determine the maximum TBS in the TBSs smaller than or equal to the third TBS and equal to the integral multiple of the preset value as the second TBS.

At 240, the terminal device sends the target transport block to the network device according to the second TBS, or receives the target transport block, which is sent by the network device according to the second TBS.

Specifically, after the terminal device determines the second TBS for transmitting the target transport block, the terminal device may generate the target transport block having the corresponding size based on the second TBS, and send the target transport block to the network device; or receive the target transport block sent by the network device based on the second TBS.

In this embodiment of the disclosure, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, the implementation complexity of the terminal device is low, and it is very easy for the terminal device to achieve forward compatibility to expand to a larger transmission resource range for use. For example, the terminal device is expanded to a wider range of time domain resources, frequency domain resources or number of transmission layers.

FIG. 3 illustrates a schematic flowchart of a method for transmitting data according to an embodiment of the disclosure. The method 300 is executed by a network device. As illustrated in FIG. 3, the specific process for transmitting the data may include the following operations.

At 310, a network device determines an MCS grade for transmitting a target transport block.

Optionally, upon the determination of the MCS grade for transmitting the target transport block, the network device may further send indication information to the terminal device to notify the terminal device of the MCS grade for transmitting the target transport block, so that the terminal device determines a corresponding TBS (i.e., the first TBS) corresponding to the MCS grade according to the MCS grade. For example, the network device indicates the MCS grade to the terminal device via indication information in Download Control Information (abbreviated as "DCI") for scheduling the data transport block.

At 320, the network device determines, according to the MCS grade as well as a TBS mapping relationship when a preset first resource parameter is met, a first TBS corresponding to the MCS grade.

Herein, the TBS mapping relationship includes a mapping relationship between MCS grades and TBSs.

It should be understood that the first resource parameter is a preset resource parameter, and the TBS mapping relationship is a TBS mapping relationship at the preset first resource parameter. For example, the first resource parameter may be a resource parameter agreed in a protocol, and the TBS mapping relationship is a mapping relationship between an MCS grade meeting the agreed resource parameter and a TBS.

Optionally, the first resource parameter may include at least one of: a first time domain resource parameter, a first frequency domain resource parameter, a first time frequency resource parameter or a first number of transmission layers.

Further, the first time domain resource parameter may include the number of time domain REs used when the target transport block is transmitted, and each of the time domain REs may be, for example, an OFDM symbol, a time slot, a mini-time slot or a subframe, etc.; the first frequency domain resource parameter may include the number of frequency domain REs used when the target transport block is transmitted, and each of the frequency domain REs may be, for example, a sub-carrier, a PRB, a sub-band or a carrier, etc.; the first time frequency resource parameter may include the number of time frequency REs used when the target transport block is transmitted, and each of the time frequency REs is a basic unit for transmitting the data; and the first number of transmission layers may include the number of transmission layers mapped by the target transport block.

The TBS mapping relationship when the first time domain resource parameter is met, i.e., the mapping relationship between the MCS and the first TBS, specifically may be referred to the description on the case 1 to case 4 in the foregoing description on the terminal device in 230 and will not be repeated for briefness.

It should be further understood that a TBS mapping relationship table of the network device for determining the first TBS may include TBS mapping relationships at a plurality of first resource parameters simultaneously, e.g., the shown table 1 simultaneously includes TBS mapping relationships at three numbers of OFDM symbols, and may also only include a TBS mapping relationship at one first resource parameter, e.g., it may only include the TBS mapping relationship when the number of OFDM symbols is 1, which is not defined thereto in the embodiments of the disclosure.

If the TBS mapping relationship table of the network device for determining the first TBS simultaneously includes the TBS mapping relationships at the plurality of first resource parameters, e.g., the shown table 1 simultaneously includes the TBS mapping relationships at three numbers of OFDM symbols, when the terminal device determines the first TBS, the terminal device may select one of the three first resource parameters (the number of OFDM symbols is 1, the number of OFDM symbols is 2 and the number of OFDM symbols is 7) to determine the first TBS. The network device may randomly select any one of the three first resource parameters, and may also select, according to a second resource parameter for transmitting the target transport block, the first resource block most matched with the second resource parameter, thus determining the first TBS corresponding to the MCS of the target transport block according to a TBS mapping relationship at the selected first resource parameter.

In addition, the TBS mapping relationship may further be a preset TBS mapping relationship at a plurality of first resource parameters, e.g., the TBS mapping relationship may be a TBS mapping relationship between physical resources corresponding to preset first time domain resource parameter and first frequency domain resource parameter and the number of transmission layers (i.e., the first number of transmission layers). The preset first resource parameter may be a resource parameter agreed between the network device and the terminal device in advance.

At 330, the network device determines a second TBS according to the first TBS and a second resource parameter for transmitting the target transport block.

Specifically, after the network device determines the first TBS corresponding to the MCS grade of the target transport block according to the TBS mapping relationship at the first resource parameter, the network device needs to determine the second TBS according to the second resource parameter for transmitting the target transport block and the determined first TBS, wherein the second TBS is a TBS for transmitting the target transport block. The first TBS is a preset TBS, and the second TBS is a TBS used to transmit the target transport block.

Optionally, the second resource parameter may include at least one of: a second time domain resource parameter, a second frequency domain resource parameter, a second time frequency resource parameter or a second number of transmission layers.

Further, the second time domain resource parameter may include the number of time domain REs used when the target transport block is transmitted, and each of the time domain REs may be, for example, an OFDM symbol, a time slot, a mini-time slot or a subframe; the second frequency domain resource parameter may include the number of frequency domain REs used when the target transport block is transmitted, and each of the frequency domain REs may be, for example, a sub-carrier, a PRB, a sub-band or a carrier; the second time frequency resource parameter may include the number of time frequency REs used when the target transport block is transmitted, and each of the time frequency REs is a basic unit for transmitting the data; and the second number of transmission layers may include the number of transmission layers mapped by the target transport block.

Optionally, the operation that the network device determines a second TBS according to the first TBS and a second resource parameter for transmitting the target transport block may include the following operation: the network device determines the second TBS according to a numerical relationship between the second resource parameter and the first resource parameter as well as the first TBS.

Specifically, upon acquisition of the first TBS, the network device may determine the second TBS according to the first TBS as well as the numerical relationship between the second resource parameter for transmitting the target transport block and the preset first resource parameter.

It is assumed that the value of the second resource parameter is N, the value of the first resource parameter is M and the first TBS determined by the terminal device according to the TBS mapping relationship at the first resource parameter is TBS 1, the second TBS may be calculated via the following manner: TBS 2=(N/M)*TBS 1, or the TBS 2 is an integer by rounding up based on the (N/M)*TBS 1, or the TBS 2 is an integer by rounding down based on the (N/M)*TBS 1, where, for example, the N is the number of time domain REs used when the target transport block is transmitted, and the M is a first time domain resource parameter, i.e., the number of time domain REs; or the N is the number of frequency domain REs used when the data transport block is transmitted, and the M is a first frequency domain resource parameter, i.e., the number of frequency domain REs; or the N is a value on the number of second transmission layers, and the M is a value on the number of first transmission layers.

In a more universal condition, the first resource parameter is a unit resource parameter. For example, the first resource parameter is an OFDM symbol, a time slot, a PRB and single-layer transmission, etc. At this moment, the network device may directly determine the second TBS according to the second resource parameter and the first TBS.

Optionally, the operation that the network device determines a second TBS according to the first TBS and a second resource parameter for transmitting the target transport block may include the following operations: the network device determines, according to the second resource parameter as well as a mapping relationship between resource parameters and resource coefficients, a resource coefficient corresponding to the second resource parameter; and the network device performs, according to the resource coefficient corresponding to the second resource parameter, data processing on the first TBS to obtain the second TBS.

Specifically, the network device may first determine the resource coefficient corresponding to the second resource parameter according to the second resource parameter as well as the mapping relationship between the resource parameters and the resource coefficients, then acquire the first TBS and determine the second TBS according to the resource coefficient and the first TBS. The mapping relationship between the resource parameters and the resource coefficients may be determined by the network device and is notified to the terminal device, and may also be agreed between the network device and the terminal device in advance. The resource coefficient is a TBS conversion coefficient at different resource parameters. Since the numbers of physical REs corresponding to different second resource parameters and capable of being used for transmitting the target transport block are different, the resource coefficient is introduced to indicate a TBS conversion condition under a condition of different numbers of REs. The resource coefficient is used for adjusting the size of the transport block. For example, the resource coefficient is used for adjusting the size of the first TBS to obtain the second TBS.

It should be understood that the resource coefficient may also be obtained based on the second resource parameter and other resource parameters. For example, a basic resource coefficient is obtained according to the second resource parameter, and then a final resource coefficient is obtained in combination with other resource parameters. For example, when the network device provides a BRS or a CSI-RS for the terminal device on a time domain resource for transmitting the target transport block for transmission, the network device may multiply a preset factor to a basic resource coefficient obtained according to the second resource parameter to obtain the resource coefficient. When the BRS or the CSI-RS is not provided by the network device for the terminal device for transmission, the factor does not need to be multiplied. Also for example, when the network device provides a reservation resource for the terminal device on a time domain resource for transmitting the target transport block, the network device may multiply, according to the size of the reservation resource, a factor corresponding to the size of the reservation resource, and enable a basic resource coefficient obtained according to the second resource parameter to multiply with the factor to obtain the resource coefficient.

Optionally, the operation that the network device determines a second TBS according to the first TBS and a second resource parameter for transmitting the target transport block may include the following operations: the network device determines a third TBS according to the second resource parameter and the first TBS; and the network device determines a maximum TBS in TBSs, that are smaller than or equal to the third TBS and equal to an integral multiple of a preset value, as the second TBS; or determines a minimum TBS in TBSs, that are greater than or equal to the third TBS and equal to the integral multiple of the preset value, as the second TBS; or determines, as the second TBS, a TBS having a minimum absolute value of a difference with the third TBS in TBSs that are equal to the integral multiple of the preset value.

Specifically, in some conditions, since the basic unit for transmitting the data is fixed, it is required that the size of the transport block is some fixed value or an integral multiple of the fixed value. For example, the byte is taken as the unit for transmitting the data and one byte is equal to 8 bits, so the TBS is 8 or an integral multiple of the 8. At this moment, the terminal device needs to first determine the third TBS according to the second resource parameter and the first TBS and determines the second TBS according to the third TBS.

The network device may determine the maximum TBS in the TBSs that are smaller than or equal to the third TBS and equal to the integral multiple of the preset value as the second TBS; or determines a minimum TBS in the TBSs that are greater than or equal to the third TBS and equal to the integral multiple of the preset value as the second TBS; or determines the TBS having the minimum absolute value of the difference with the third TBS in the TBSs equal to the integral multiple of the preset value as the second TBS.

Optionally, the operation that the network device determines a second TBS according to the first TBS and a second resource parameter for transmitting the target transport block may include the following operation: the network device determines the third TBS according to a numerical relationship between the second resource parameter and the first resource parameter as well as the first TBS.

Optionally, the operation that the network device determines a second TBS according to the first TBS and a second resource parameter for transmitting the target transport block may include the following operations: the network device determines, according to the second resource parameter as well as a mapping relationship between resource parameters and resource coefficients, a resource coefficient corresponding to the second resource parameter; and the network device performs, according to the resource coefficient corresponding to the second resource parameter, data processing on the first TBS to obtain the third TBS.

The specific process that the network device determines the third TBS according to the second resource parameter for transmitting the target transport block and the first TBS may be referred to the description on the manner 1 to manner 4 in the description on the terminal device in 240 and will not be repeated for the briefness.

At 340, the network device sends the target transport block to the terminal device according to the second TBS, or receives the target transport block, which is sent by the terminal device according to the second TBS.

Specifically, after the network device determines the second TBS for transmitting the target transport block, the network device may generate the target transport block having the corresponding size based on the second TBS, and send the target transport block to the terminal device; or receive the target transport block from the terminal device based on the second TBS.

In this embodiment of the disclosure, the network device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, it is very easy for the network device to achieve forward compatibility to expand to a larger transmission resource range for use. For example, the network device is expanded to a wider range of time domain resources, frequency domain resources or number of transmission layers.

FIG. 4 illustrates a schematic block diagram of a terminal device 400 according to an embodiment of the disclosure. As illustrated in FIG. 4, the terminal device 400 may include a determination unit 410 and a transmission unit 420.

The determination unit 410 is configured to: receive indication information sent by a network device, wherein the indication information indicates an MCS grade for transmitting a target transport block.

The determination unit 410 is further configured to: determine, according to the MCS grade as well as a TBS mapping relationship when a preset first resource parameter is met, a first TBS corresponding to the MCS grade, wherein the TBS mapping relationship includes a mapping relationship between MCS grades and TBSs.

The determination unit 410 is further configured to: determine a second TBS according to the first TBS and a second resource parameter for transmitting the target transport block.

The transmission unit 420 is configured to: send the target transport block to the network device according to the second TBS, or receive the target transport block sent by the network device.

Therefore, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, the implementation complexity of the terminal device is low, and it is very easy for the terminal device to achieve forward compatibility to expand to a larger transmission resource range for use. For example, the terminal device is expanded to a wider range of time domain resources, frequency domain resources or number of transmission layers.

Optionally, the determination unit 410 is specifically configured to: determine the second TBS according to a numerical relationship between the second resource parameter and the first resource parameter as well as the first TBS.

Optionally, the determination unit 410 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the second TBS.

Optionally, the determination unit 410 is specifically configured to: determine a third TBS according to the second resource parameter and the first TBS; and determine a maximum TBS in TBSs, that are smaller than or equal to the third TBS and equal to an integral multiple of a preset value, as the second TBS; or determine a minimum TBS in TBSs, that are greater than or equal to the third TBS and equal to the integral multiple of the preset value, as the second TBS; or determine, as the second TBS, a TBS having a minimum absolute value of a difference with the third TBS in TBSs that are equal to the integral multiple of the preset value.

Optionally, the determination unit 410 is specifically configured to: determine the third TBS according to a numerical relationship between the second resource parameter and the first resource parameter as well as the first TBS.

Optionally, the determination unit 410 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the third TBS.

Optionally, the first resource parameter may include at least one of: a first time domain resource parameter, a first frequency domain resource parameter, a first time frequency resource parameter or a first number of transmission layers.

Optionally, the second resource parameter may include at least one of: a second time domain resource parameter, a second frequency domain resource parameter, a second time frequency resource parameter or a second number of transmission layers.

Further, the second time domain resource parameter includes the number of time domain REs used when the target transport block is transmitted, and each of the time domain REs is an OFDM symbol, a time slot, a mini-time slot or a subframe; the second frequency domain resource parameter includes the number of frequency domain REs used when the target transport block is transmitted, and each of the frequency domain REs is a sub-carrier, a PRB, a sub-band or a carrier; the second time frequency resource parameter includes the number of time frequency REs used when the target transport block is transmitted; and the second number of transmission layers includes the number of transmission layers mapped by the target transport block.

Optionally, the transmission unit 420 is further configured to: receive, before determining the MCS grade for transmitting the target transport block by the determination unit 410, indication information from the network device, wherein the indication information indicates the MCS grade.

It should be understood that the terminal device 400 may correspond to the terminal device in the method embodiment, may implement corresponding functions of the terminal device and will not be repeated for the briefness.

Figure 5:
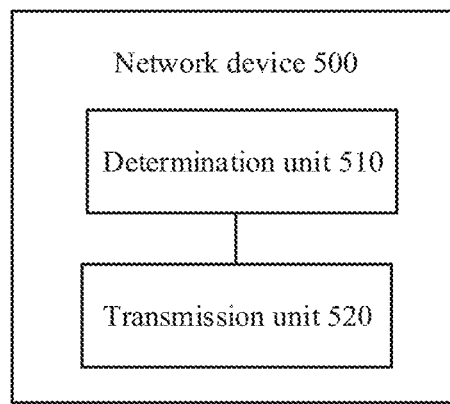
FIG. 5 illustrates a schematic block diagram of a network device according to an embodiment of the disclosure.

FIG. 5 illustrates a schematic block diagram of a network device 500 according to an embodiment of the disclosure. As illustrated in FIG. 5, the network device 500 may include a determination unit 510 and a transmission unit 520.

The determination unit 510 is configured to: send indication information to the terminal device, wherein the indication information indicates an MCS grade for transmitting a target transport block.

The determination unit 510 is further configured to: determine, according to the MCS grade as well as a TBS mapping relationship when a preset first resource parameter is met, a first TBS corresponding to the MCS grade, wherein the TBS mapping relationship includes a mapping relationship between MCS grades and TBSs.

The determination unit 510 is further configured to: determine a second TBS according to the first TBS and a second resource parameter for transmitting the target transport block.

The transmission unit 520 is configured to: send the target transport block to a terminal according to the second TBS, or receive the target transport block, which is sent by the terminal device according to the second TBS.

Therefore, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, it is very easy for the network device to achieve forward compatibility to expand to a larger transmission resource range for use. For example, the network device is expanded to a wider range of time domain resources, frequency domain resources or number of transmission layers.

Optionally, the determination unit 510 is specifically configured to: determine the second TBS according to a numerical relationship between the second resource parameter and the first resource parameter as well as the first TBS.

Optionally, the determination unit 510 is specifically configured to: determine, according to the second resource parameter as well as a mapping relationship between resource parameters and resource coefficients, a resource coefficient corresponding to the second resource parameter: and perform, according to the resource coefficient corresponding to the second resource parameter, data processing on the first TBS to obtain the second TBS.

Optionally, the determination unit 510 is specifically configured to: determine a third TBS according to the second resource parameter and the first TBS; and determine a maximum TBS in TBSs, that are smaller than or equal to the third TBS and equal to an integral multiple of a preset value, as the second TBS; or determine a minimum TBS in TBSs, that are greater than or equal to the third TBS and equal to the integral multiple of the preset value, as the second TBS; or determine, as the second TBS, a TBS having a minimum absolute value of a difference with the third TBS in TBSs that are equal to the integral multiple of the preset value.

Optionally, the determination unit 510 is specifically configured to: determine the third TBS according to a numerical relationship between the second resource parameter and the first resource parameter as well as the first TBS.

Optionally, the determination unit 510 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the third TBS.

Optionally, the first resource parameter may include at least one of: a first time domain resource parameter, a first frequency domain resource parameter, a first time frequency resource parameter or a first number of transmission layers.

Optionally, the second resource parameter may include at least one of: a second time domain resource parameter, a second frequency domain resource parameter, a second time frequency resource parameter or a second number of transmission layers.

Further, the second time domain resource parameter includes the number of time domain REs used when the target transport block is transmitted, and each of the time domain REs is an OFDM symbol, a time slot or a mini-time slot; the second frequency domain resource parameter includes the number of frequency domain REs used when the target transport block is transmitted, and each of the frequency domain REs is a sub-carrier, a PRB or a sub-band; the second time frequency resource parameter includes the number of time frequency REs used when the target transport block is transmitted; and the second number of transmission layers includes the number of transmission layers mapped by the target transport block.

Optionally, the transmission unit 520 is further configured to: send indication information to the terminal device, wherein the indication information indicates the MCS grade.

Figure 6:
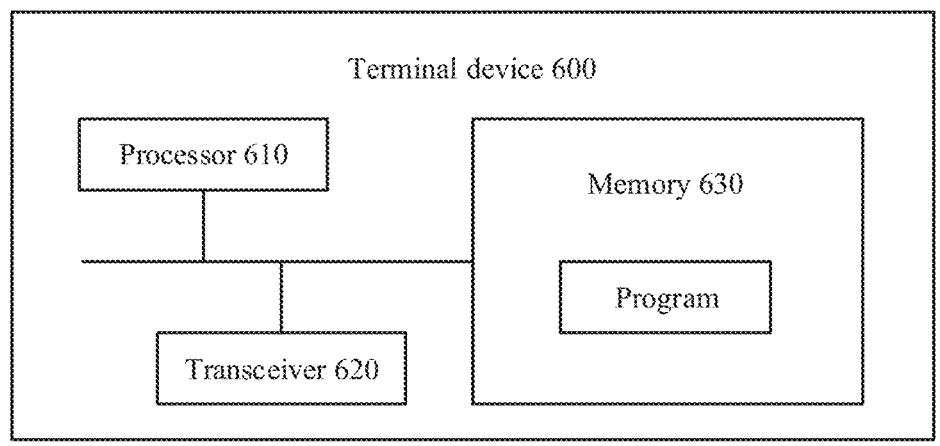
FIG. 6 illustrates a schematic structural diagram of a terminal device according to an embodiment of the disclosure.

FIG. 6 illustrates a schematic structural diagram of a terminal device 600 according to an embodiment of the disclosure. As illustrated in FIG. 6, the terminal device may include a processor 610, a transceiver 620 and a memory 630. The processor 610, the transceiver 620 and the memory 630 are communicated to each other via an internal connection passageway. The memory 630 is configured to store an instruction. The processor 610 is configured to execute the instruction stored by the memory 630 to control the transceiver 620 to receive a signal or send the signal.

The processor 610 is configured to: determine an MCS grade for transmitting a target transport block; determine, according to the MCS grade as well as a TBS mapping relationship when a preset first resource parameter is met, a first TBS corresponding to the MCS grade, wherein the TBS mapping relationship includes a mapping relationship between MCS grades and TBSs; and determine a second TBS according to the first TBS and a second resource parameter for transmitting the target transport block.

The transceiver 620 is configured to: send the target transport block to the network device according to the second TBS, or receive the target transport block sent by the network device.

Therefore, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, the implementation complexity of the terminal device is low, and it is very easy for the terminal device to achieve forward compatibility to expand to a larger transmission resource range for use. For example, the terminal device is expanded to a wider range of time domain resources, frequency domain resources or number of transmission layers.

Optionally, the processor 610 is specifically configured to: determine the second TBS according to a numerical relationship between the second resource parameter and the first resource parameter as well as the first TBS.

Optionally, the processor 610 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the second TBS.

Optionally, the processor 610 is specifically configured to: determine a third TBS according to the second resource parameter and the first TBS; and determine a maximum TBS in TBSs, that are smaller than or equal to the third TBS and equal to an integral multiple of a preset value, as the second TBS; or determine a minimum TBS in TBSs, that are greater than or equal to the third TBS and equal to the integral multiple of the preset value, as the second TBS; or determine, as the second TBS, a TBS having a minimum absolute value of a difference with the third TBS in TBSs that are equal to the integral multiple of the preset value.

Optionally, the processor 610 is specifically configured to: determine the third TBS according to a numerical relationship between the second resource parameter and the first resource parameter as well as the first TBS.

Optionally, the processor 610 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the third TBS.

Optionally, the first resource parameter may include at least one of: a first time domain resource parameter, a first frequency domain resource parameter, a first time frequency resource parameter or a first number of transmission layers.

Optionally, the second resource parameter may include at least one of: a second time domain resource parameter, a second frequency domain resource parameter, a second time frequency resource parameter or a second number of transmission layers.

Further, the second time domain resource parameter includes the number of time domain REs used when the target transport block is transmitted, and each of the time domain REs is an OFDM symbol, a time slot or a mini-time slot; the second frequency domain resource parameter includes the number of frequency domain REs used when the target transport block is transmitted, and each of the frequency domain REs is a sub-carrier, a PRB or a sub-band; the second time frequency resource parameter includes the number of time frequency REs used when the target transport block is transmitted; and the second number of transmission layers includes the number of transmission layers mapped by the target transport block.

Optionally, the transceiver 620 is further configured to: receive, before determining the MCS grade for transmitting the target transport block by the processor 610, indication information from the network device, wherein the indication information indicates the MCS grade.

It should be understood that in this embodiment of the disclosure, the processor 610 may be a Central Processing Unit (abbreviated as "CPU"). The processor 610 may further be other 50 universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 630 may include a Read Only Memory (ROM) and a Random Access Memory (RAM) and provides instructions and data for the processor 610. A part of the memory 630 may further include a nonvolatile RAM. For example, the memory 630 may further store information on a type of a storage device.

During an implementation process, the operations of the methods may be accomplished by an integrated logic circuit of hardware in the processor 610 or an instruction in a software form. Operations of the positioning methods disclosed in combination the embodiments of the disclosure may be directly executed and accomplished by means of a hardware processor or may be executed and accomplished using a combination of hardware and software modules in the processor 610. The software module may be located in a mature storage medium in the art, such as a RAM, a flash memory, an ROM, a Programmable ROM (PROM), an Electrically EPROM (EEPROM) or a register. The storage medium is located in the memory 630. The processor 610 reads information from the memory 630 and completes the operations of the foregoing methods in combination with the hardware of the processor. In order to avoid repetition, the above will not be described herein in detail.

The terminal device 600 according to this embodiment of the disclosure may correspond to the terminal device for executing the method 200 in the method 200 and the terminal device 400 according to the embodiments of the disclosure; and each unit or module in the terminal device 600 is respectively configured to execute each action or processing operation executed by the terminal device in the method 200. Herein, in order to avoid the repetition, the detailed description is omitted.

Figure 7:
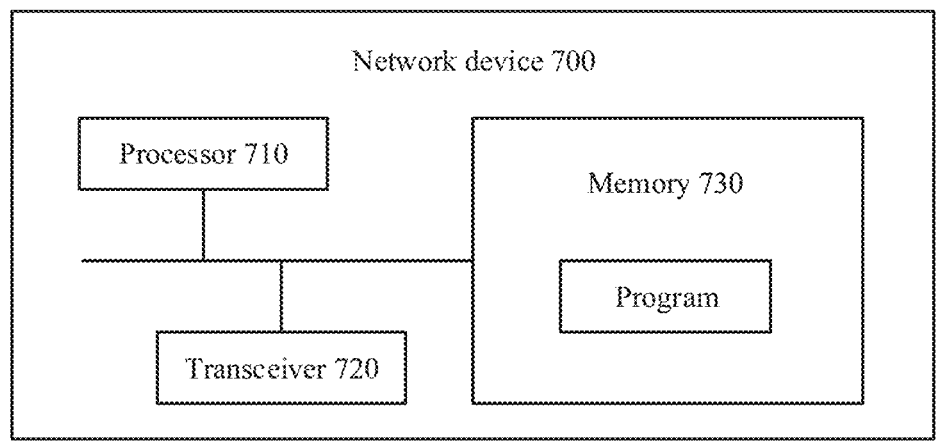
FIG. 7 illustrates a schematic structural diagram of a network device according to an embodiment of the disclosure.

FIG. 7 illustrates a schematic structural diagram of a network device 700 according to an embodiment of the disclosure. As illustrated in FIG. 7, the network device may include a processor 710, a transceiver 720 and a memory 730. The processor 710, the transceiver 720 and the memory 730 are communicated to each other via an internal connection passageway. The memory 730 is configured to store an instruction. The processor 710 is configured to execute the instruction stored by the memory 730 to control the transceiver 720 to receive a signal or send the signal.

The processor 710 is configured to: determine an MCS grade for transmitting a target transport block; determine, according to the MCS grade as well as a TBS mapping relationship when a preset first resource parameter is met, a first TBS corresponding to the MCS grade, wherein the TBS mapping relationship includes a mapping relationship between MCS grades and TBSs; and determine a second TBS according to the first TBS and a second resource parameter for transmitting the target transport block.

The transceiver 720 is configured to: send the target transport block to a terminal according to the second TBS, or receive the target transport block, which is sent by the terminal device according to the second TBS.

Therefore, the terminal device determines a first TBS according to a TBS mapping relationship at a preset resource parameter, determines the size of a transport block required at present according to the resource parameter used by the present transport block and the first TBS, and thus can effectively acquire information of a TBS for transmitting the data under a condition in which a value range of the resource parameter for transmitting the data is large. Meanwhile, it is very easy for the network device to achieve forward compatibility to expand to a larger transmission resource range for use. For example, the network device is expanded to a wider range of time domain resources, frequency domain resources or number of transmission layers.

Optionally, the processor 710 is specifically configured to: determine the second TBS 50 according to a numerical relationship between the second resource parameter and the first resource parameter as well as the first TBS.

Optionally, the processor 710 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the second TBS.

Optionally, the processor 710 is specifically configured to: determine a third TBS according to the second resource parameter and the first TBS; and determine a maximum TBS in TBSs, that are smaller than or equal to the third TBS and equal to an integral multiple of a preset value, as the second TBS; or determine a minimum TBS in TBSs, that are greater than or equal to the third TBS and equal to the integral multiple of the preset value, as the second TBS; or determine, as the second TBS, a TBS having a minimum absolute value of a difference with the third TBS in TBSs that are equal to the integral multiple of the preset value.

Optionally, the processor 710 is specifically configured to: determine the third TBS according to a numerical relationship between the second resource parameter and the first resource parameter as well as the first TBS.

Optionally, the processor 710 is specifically configured to: determine, according to the second resource parameter as well as a mapping relationship between resource parameters and resource coefficients, a resource coefficient corresponding to the second resource parameter; and perform, according to the resource coefficient corresponding to the second resource parameter, data processing on the first TBS to obtain the third TBS.

Optionally, the first resource parameter may include at least one of: a first time domain resource parameter, a first frequency domain resource parameter, a first time frequency resource parameter or a first number of transmission layers.

Optionally, the second resource parameter may include at least one of: a second time domain resource parameter, a second frequency domain resource parameter, a second time frequency resource parameter or a second number of transmission layers.

Further, the second time domain resource parameter includes the number of time domain REs used when the target transport block is transmitted, and each of the time domain REs is an OFDM symbol, a time slot or a mini-time slot; the second frequency domain resource parameter includes the number of frequency domain REs used when the target transport block is transmitted, and each of the frequency domain REs is a sub-carrier, a PRB or a sub-band; the second time frequency resource parameter includes the number of time frequency REs used when the target transport block is transmitted; and the second number of transmission layers includes the number of transmission layers mapped by the target transport block.

Optionally, the transceiver 720 is further configured to: send indication information to the terminal device, wherein the indication information indicates the MCS grade.

It should be understood that in this embodiment of the disclosure, the processor 710 may be a Central Processing Unit (abbreviated as "CPU"). The processor 710 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 730 may include a Read Only Memory (ROM) and a Random Access Memory (RAM) and provides instructions and data for the processor 710. A part of the memory 730 may further include a nonvolatile RAM. For example, the memory 730 may further store information on a type of a storage device.

During an implementation process, the operations of the methods may be accomplished by an integrated logic circuit of hardware in the processor 710 or an instruction in a software form. Operations of the positioning methods disclosed in combination the embodiments of the disclosure may be directly executed and accomplished by means of a hardware processor or may be executed and accomplished using a combination of hardware and software modules in the processor 710. The software module may be located in a mature storage medium in the art, such as a RAM, a flash memory, an ROM, a Programmable ROM (PROM), an Electrically EPROM (EEPROM) or a register. The storage medium is located in the memory 730. The processor 710 reads information from the memory 730 and completes the operations of the foregoing methods in combination with the hardware of the processor. In order to avoid repetition, the above will not be described herein in detail.

The network device 700 according to this embodiment of the disclosure may correspond to the network device for executing the method 300 in the method 300 and the network device 500 according to the embodiments of the disclosure; and each unit or module in the network device 700 is respectively configured to execute each action or processing operation executed by the network device in the method 300. Herein, in order to avoid the repetition, the detailed description is omitted.

Figure 8:
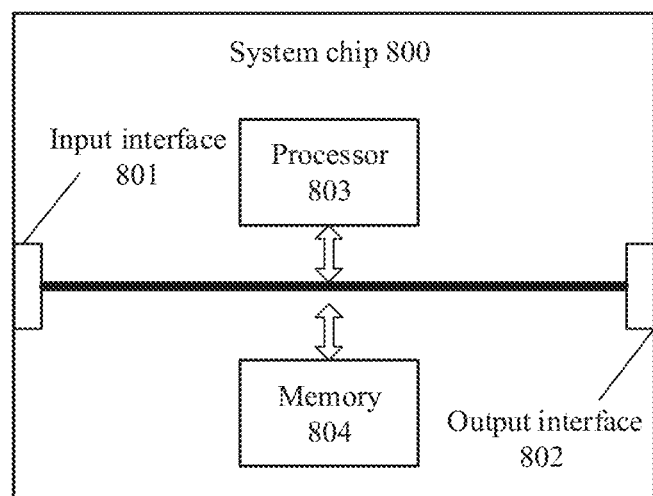
FIG. 8 illustrates a schematic structural diagram of a system chip according to an embodiment of the disclosure.

FIG. 8 illustrates a schematic structural diagram of a system chip according to an embodiment of the disclosure. The system chip 800 in FIG. 8 includes an input interface 801, an output interface 802, at least one processor 803 and a memory 804. The input interface 801, the output interface 802, the at least one processor 803 and the memory 804 are connected to each other via an internal connection passageway. The processor 803 is configured to execute a code in the memory 804.

Optionally, when the code is executed, the processor 803 may implement the method executed by the terminal device in the method embodiment. The above will not be repeated for the briefness.

Optionally, when the code is executed, the processor 803 may implement the method executed by the network device in the method embodiment. The above will not be repeated for the briefness.

It should be understood that in various embodiments of the disclosure, the numeral of each process does not mean the precedence of the execution sequence. The execution sequence of each process should be determined by its function and internal logic and does not intended to form any limit to the implementation process in the embodiments of the disclosure.

A person of ordinary skill in the art may be aware that, in combination with the examples described in the embodiments disclosed in this specification, units and algorithm operations may be implemented by electronic hardware, computer software or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system. apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the operations of the methods described in the embodiments of the disclosure. The foregoing storage medium includes any medium that can store program code, such as a U disk, a removable hard disk, an ROM, an RAM, a magnetic disk, or an optical disc.

The foregoing descriptions are merely specific implementation manners of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A method for transmitting data, comprising:
   determining, by a terminal device, a Modulation Coding Scheme (MCS) grade for transmitting a target transport block;

determining, by the terminal device, according to the MCS grade as well as a Transport Block Size (TBS) mapping relationship when a preset first resource parameter is met, a first TBS corresponding to the MCS grade, wherein the TBS mapping relationship comprises a mapping relationship between MCS grades and TBSs;

determining, by the terminal device, a second TBS according to the first TBS and a second resource parameter for transmitting the target transport block; and sending, by the terminal device, the target transport block to a network device according to the second TBS, or receiving the target transport block, which is sent by the network device according to the second TBS.

2. The method of claim 1, wherein the determining, by the terminal device, a second TBS according to the first TBS and a second resource parameter for transmitting the target transport block comprises:

determining, by the terminal device, the second TBS according to a numerical relationship between the second resource parameter and the first resource parameter as well as the first TBS.

3. The method of claim 1, wherein the determining, by the terminal device, a second TBS according to the first TBS and a second resource parameter for transmitting the target transport block comprises:

determining, by the terminal device, a third TBS according to the second resource parameter and the first TBS; and determining, by the terminal device, a maximum TBS in TBSs, that are smaller than or equal to the third TBS and equal to an integral multiple of a preset value, as the second TBS; or determining a minimum TBS in TBSs, that are greater than or equal to the third TBS and equal to the integral multiple of the preset value, as the second TBS; or determining, as the second TBS, a TBS having a minimum absolute value of a difference with the third TBS in TBSs that are equal to the integral multiple of the preset value.

4. The method of claim 1, wherein the first resource parameter comprises at least one of:

a first time domain resource parameter, a first frequency domain resource parameter, a first time frequency resource parameter or a first number of transmission layers.

5. The method of claim 1, wherein the second resource parameter comprises at least one of:

a second time domain resource parameter, a second frequency domain resource parameter, a second time frequency resource parameter or a second number of transmission layers.

6. The method of claim 5, wherein the second time domain resource parameter comprises number of time domain Resource Elements (REs) used when the target transport block is transmitted, and each of the time domain REs is an Orthogonal Frequency Division Multiplexing (OFDM) symbol, a time slot, a mini-time slot or a subframe;

the second frequency domain resource parameter comprises number of frequency domain REs used when the target transport block is transmitted, and each of the frequency domain REs is a sub-carrier, a Physical Resource Block (PRB), a sub-band or a carrier;

the second time frequency resource parameter comprises number of time frequency REs used when the target transport block is transmitted; and the second number of transmission layers comprises number of transmission layers mapped by the target transport block.

7. The method of claim 1, wherein the method further comprises:

before determining, by a terminal device, an MCS grade for transmitting a target transport block, receiving, by the terminal device, indication information from the network device, wherein the indication information indicates the MCS grade.

8. A terminal device, comprising:

a processor, configured to determine a Modulation Coding Scheme (MCS) grade for transmitting a target transport block;

wherein the processor is further configured to determine, according to the MCS grade as well as a Transport Block Size (TBS) mapping relationship when a preset first resource parameter is met, a first TBS corresponding to the MCS grade, the TBS mapping relationship comprises a mapping relationship between MCS grades and TBSs, and the processor is further configured to determine a second TBS according to the first TBS and a second resource parameter for transmitting the target transport block; and a transceiver, configured to send the target transport block to a network device according to the second TBS, or receive the target transport block, which is sent by the network device according to the second TBS.

9. The terminal device of claim 8, wherein the processor is specifically configured to:

determine the second TBS according to a numerical relationship between the second resource parameter and the first resource parameter as well as the first TBS.

10. The terminal device of claim 8, wherein the processor is specifically configured to:

determine a third TBS according to the second resource parameter and the first TBS; and determine a maximum TBS in TBSs, that are greater than or equal to the third TBS and equal to the integral multiple of the preset value, as the second TBS; or determine a minimum TBS in TBSs, that are greater than or equal to the third TBS and equal to the integral multiple of the preset value, as the second TBS; or determine, as the second TBS, a TBS having a minimum absolute value of a difference with the third TBS in TBSs that are equal to the integral multiple of the preset value.

11. The terminal device of claim 8, wherein the first resource parameter comprises at least one of:

a first time domain resource parameter, a first frequency domain resource parameter, a first time frequency resource parameter or a first number of transmission layers.

12. The terminal device of claim 8, wherein the second resource parameter comprises at least one of:

a second time domain resource parameter, a second frequency domain resource parameter, a second time frequency resource parameter or a second number of transmission layers.

13. The terminal device of claim 12, wherein the second time domain resource parameter comprises number of time domain Resource Elements (REs) used when the target transport block is transmitted, and each of the time domain REs is an Orthogonal Frequency Division Multiplexing (OFDM) symbol, a time slot, a mini-time slot or a subframe;

the second frequency domain resource parameter comprises number of frequency domain REs used when the target transport block is transmitted, and each of the frequency domain REs is a sub-carrier, a Physical Resource Block (PRB), a sub-band or a carrier;

the second time frequency resource parameter comprises number of time frequency REs used when the target transport block is transmitted; and the second number of transmission layers comprises number of transmission layers mapped by the target transport block.

14. The terminal device of claim 8, wherein the transceiver is further configured to:

receive, before the processor determines the MCS grade for transmitting the target transport block, indication information from the network device, wherein the indication information indicates the MCS grade.

15. A network device, comprising:

a processor, configured to determine a Modulation Coding Scheme (MCS) grade for transmitting a target transport block, wherein the processor is further configured to determine, according to the MCS grade as well as a Transport Block Size (TBS) mapping relationship when a preset first resource parameter is met, a first TBS corresponding to the MCS grade, wherein the TBS mapping relationship comprises a mapping relationship between MCS grades and TBSs; and the processor is further configured to determine a second TBS according to the first TBS and a second resource parameter for transmitting the target transport block; and a transceiver, configured to send the target transport block to a terminal according to the second TBS, or receive the target transport block, which is sent by the terminal device according to the second TBS.

16. The network device of claim 15, wherein the processor is specifically configured to:

determine a third TBS according to the second resource parameter and the first TBS; and determine a maximum TBS in TBSs, that are greater than or equal to the third TBS and equal to the integral multiple of the preset value, as the second TBS; or determine a minimum TBS in TBSs, that are greater than or equal to the third TBS and equal to the integral multiple of the preset value, as the second TBS; or determine, as the second TBS, a TBS having a minimum absolute value of a difference with the third TBS in TBSs that are equal to the integral multiple of the preset value.

17. The network device of claim 15, wherein the first resource parameter comprises at least one of:

a first time domain resource parameter, a first frequency domain resource parameter, a first time frequency resource parameter or a first number of transmission layers.

18. The network device of to claim 15, wherein the second resource parameter comprises at least one of:

a second time domain resource parameter, a second frequency domain resource parameter, a second time frequency resource parameter or a second number of transmission layers.

19. The network device of claim 18, wherein the second time domain resource parameter comprises number of time domain Resource Elements (REs) used when the target transport block is transmitted, and each of the time domain REs is an Orthogonal Frequency Division Multiplexing (OFDM) symbol, a time slot, a mini-time slot or a subframe;

the second frequency domain resource parameter comprises number of frequency domain REs used when the target transport block is transmitted, and each of the frequency domain REs is a sub-carrier, a Physical Resource Block (PRB), a sub-band or a carrier;

the second time frequency resource parameter comprises number of time frequency REs used when the target transport block is transmitted; and the second number of transmission layers comprises number of transmission layers mapped by the target transport block.

20. The network device of claim 15, wherein the transceiver is further configured to:

send indication information to the terminal device, wherein the indication information indicates the MCS grade.

21. The method of claim 1, wherein the preset first resource parameter comprises a number of resource elements.

22. The terminal device of claim 8, wherein the preset first resource parameter comprises a number of resource elements.

* * * * *